United States Patent
Sjong (10) Patent No.: US 8,530,241 B2
(45) Date of Patent: Sep. 10, 2013

(54) HYDROFLUOROCARBON SENSING AND ELIMINATION DEVICE AND METHOD

(75) Inventor: Angele Sjong, Louisville, CO (US)

(73) Assignee: Empire Technology Development LLC, Wilmington, DE (US)

( * ) Notice: Subject to any disclaimer, the term of this patent is extended or adjusted under 35 U.S.C. 154(b) by 405 days.

(21) Appl. No.: 13/063,721

(22) PCT Filed: Aug. 27, 2010

(86) PCT No.: PCT/US2010/046976
§ 371 (c)(1),
(2), (4) Date: Mar. 11, 2011

(87) PCT Pub. No.: WO2012/026945
PCT Pub. Date: Mar. 1, 2012

(65) Prior Publication Data
US 2012/0052586 A1    Mar. 1, 2012

(51) Int. Cl.
*G01N 33/00* (2006.01)
*G01N 27/66* (2006.01)
*B01D 53/30* (2006.01)
*B01D 53/70* (2006.01)
*B01D 53/86* (2006.01)

(52) U.S. Cl.
USPC ............... 436/126; 422/62; 422/83; 422/90; 422/98; 436/124; 436/155; 436/159

(58) Field of Classification Search
USPC ............... 422/62, 83, 90, 98; 436/124, 126, 436/155, 159
See application file for complete search history.

(56) References Cited

U.S. PATENT DOCUMENTS

| 2,373,111 | A | * | 4/1945 | Francis | 436/104 |
|---|---|---|---|---|---|
| 2,907,639 | A | * | 10/1959 | Alexandre et al. | 422/86 |
| 3,249,246 | A | | 5/1966 | Mahoney | |
| 3,814,587 | A | * | 6/1974 | Pappas | 436/125 |
| 4,407,778 | A | * | 10/1983 | Shiratori et al. | 422/90 |
| 5,093,196 | A | * | 3/1992 | Hecq et al. | 428/410 |
| 5,128,269 | A | * | 7/1992 | Oitate et al. | 436/126 |
| 5,284,569 | A | * | 2/1994 | Lee et al. | 204/425 |
| 5,338,685 | A | * | 8/1994 | Frenk | 436/124 |
| 5,371,019 | A | * | 12/1994 | Manz et al. | 436/126 |

(Continued)

FOREIGN PATENT DOCUMENTS

| JP | 3-42015 | * | 2/1991 |
|---|---|---|---|
| JP | 6269637 | | 9/1994 |
| JP | 2000088453 | | 3/2000 |
| JP | 2007-237150 | * | 9/2007 |

OTHER PUBLICATIONS

Daikinasia webpage, "Leak Detectors," retreived from the Internet: URL:<http://www.daikinasia.com.sg/products/Pg20.pdf>, 1 page.

(Continued)

*Primary Examiner* — Arlen Soderquist
(74) *Attorney, Agent, or Firm* — Foley & Lardner LLP (57) ABSTRACT

The present technology provides an illustrative hydrofluorocarbon (HFC) elimination device. An HFC sensing device is configured to detect an ambient, gaseous HFC composition. The HFC elimination device further includes a component comprising a surface that includes glass, and a heating element that is configured to heat the glass to a temperature to decompose the ambient, gaseous HFC composition in response to detection of the ambient, gaseous HFC composition by the HFC sensing device.

20 Claims, 5 Drawing Sheets

(56) References Cited

U.S. PATENT DOCUMENTS

| | | | |
|---|---|---|---|
| 5,469,714 A * | 11/1995 | Manz et al. | 62/125 |
| 5,514,595 A * | 5/1996 | Olds et al. | 436/126 |
| 5,965,786 A * | 10/1999 | Rostaing et al. | 204/157.3 |
| 6,022,489 A * | 2/2000 | Izumikawa et al. | 252/182.32 |
| 6,290,918 B1 * | 9/2001 | Rostaing et al. | 422/186 |
| 6,294,709 B1 * | 9/2001 | Izumikawa et al. | 423/240 R |
| 2007/0208154 A1 * | 9/2007 | Stavens et al. | 526/280 |
| 2012/0047926 A1 * | 3/2012 | Sjong | 62/129 |

OTHER PUBLICATIONS

EPA webpage, "Recommended Practices for Minimizing HFC Emissions from Refrigerator-Freezer Factories," Nov. 2005, retreived from the internet: URL:<http://www.epa.gov/Ozone/snap/download/RecommendedPracticesforHFCemissions.pdf>, 7 pages.

LOCTITE webpage, "UV-Curing Adhesive," printed on Apr. 29, 2011, retrieved from the internet: URL:<http://www.loctite.co.uk/cps/rde/xchg/henkel_uke/hs.xsl/light-cure-adhesives-4481.htm>, 1 page.

Wikipedia webpage, "Dealkalization," printed on Apr. 29, 2011, retrieved from the Internet: URL<: http://en.wikipedia.org/wiki/Dealkalization>, 3 pages.

Wikipedia webpage, "Soda-lime glass," printed on Apr. 29, 2011, retrieved from the internet: URL:<http://en.wikipedia.org/wiki/Soda-lime_glass>, 3 pages.

* cited by examiner

HYDROFLUOROCARBON SENSING AND ELIMINATION DEVICE AND METHOD

CROSS-REFERENCE TO RELATED APPLICATIONS

The present application is a U.S. national stage application claiming the benefit of International Application No. PCT/US2010/046976, filed on Aug. 27, 2010, the entire contents of which is incorporated herein by reference in its entirety.

BACKGROUND

The following description is provided to assist the understanding of the reader. None of the information provided or references cited is admitted to be prior art.

Hydrofluorocarbons (HFCs) are commonly used as refrigerants in household refrigeration devices such as refrigerators and air conditioners. HFCs are generally safe, inexpensive, chemically stable, efficient, non-toxic, and non-ozone depleting. However, many HFCs have high global warming potential (GWP) values. Gases having high GWP values are generally considered to increase global warming at a higher rate than gases having low GWP values. Due to the numerous advantages of HFCs, a suitable alternative refrigerant having similar safety, toxicity, and chemical stability characteristics is not readily available.

Many refrigeration devices currently in use are susceptible to HFC leaks. Such leaks enable the release of HFCs into the atmosphere thus further contributing to global warming. Consequently, there is a need for devices and systems that detect and prevent HFC emissions in the event of such a leak.

SUMMARY

The present technology provides an illustrative hydrofluorocarbon (HFC) elimination device that includes an HFC sensing device that is configured to detect an ambient, gaseous HFC composition. The HFC elimination device further includes a component comprising a surface that includes glass, and a heating element that is configured to heat the glass to a temperature to decompose the ambient, gaseous HFC composition in response to detection of the ambient, gaseous HFC composition by the HFC sensing device.

The present technology also includes an illustrative system that includes a hydrofluorocarbon (HFC) detector and an HFC elimination device. The HFC detector is configured to detect an ambient HFC composition and to communicate an indication of the presence of the ambient HFC composition to an HFC elimination device. The HFC elimination device is communicatively coupled to the HFC detector and includes a component comprising a surface that includes glass, and a heating element that is configured to heat the glass to a temperature to decompose the ambient HFC composition in response to the detection of the ambient HFC composition by the HFC detector.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Hydrofluorocarbon (HFC) leaks may occur in any type of refrigeration device (e.g., refrigerators, air conditioners, etc.) that utilizes HFCs as a refrigerant. HFCs have high global warming potential values and, as such, emission of HFCs into the atmosphere may contribute to global warming. Described herein are illustrative devices and systems for detecting and eliminating ambient, gaseous HFC compositions. These HFC elimination devices include an internal heating element that is configured to heat a glass surface in response to detection of an ambient HFC composition by an HFC sensing device. When the heated glass surface contacts the ambient HFC composition, the HFC is decomposed as part of a dealkalization process to form various non-toxic, non-traceable byproducts. The HFC elimination device and system described below allow for elimination of ambient HFC compositions in a safe, cost effective, and efficient manner.

Figure 1:
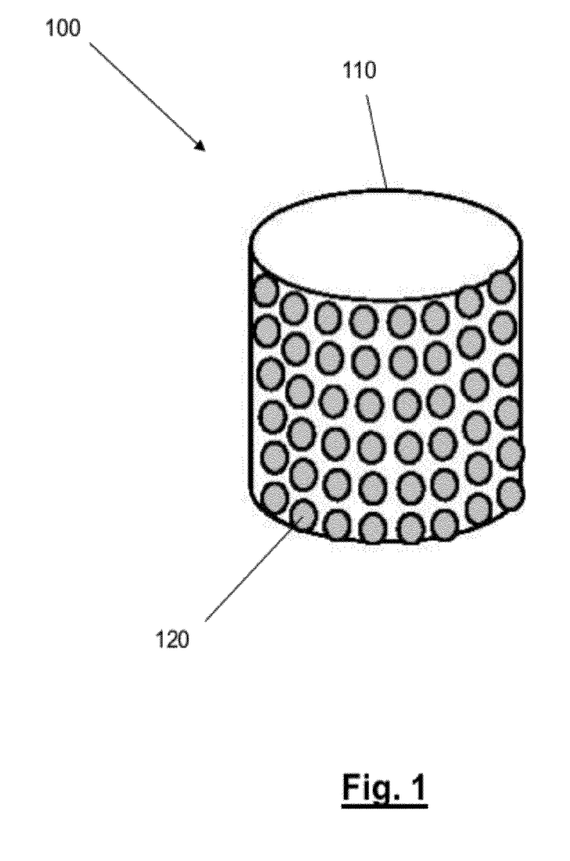
FIG. 1 depicts a hydrofluorocarbon (HFC) elimination device in accordance with an illustrative embodiment.
Figure 2:
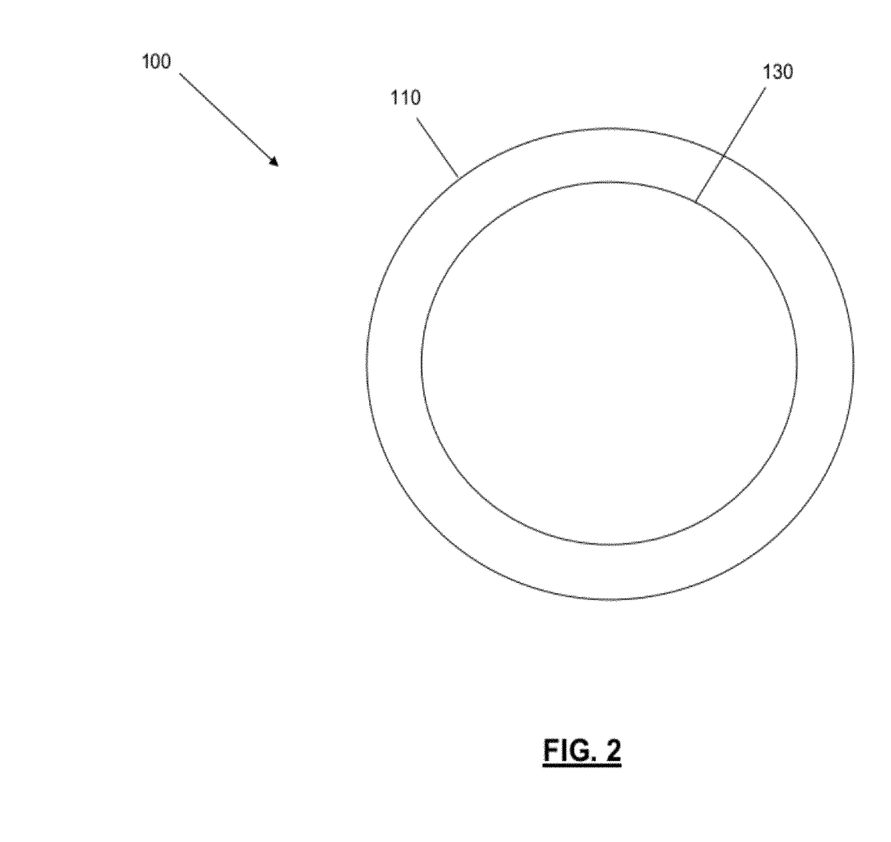
FIG. 2 depicts a cross-sectional view of the HFC elimination device of FIG. 1 in accordance with an illustrative embodiment.

FIG. 1 depicts a hydrofluorocarbon (HFC) elimination device 100 in accordance with an illustrative embodiment. HFC elimination device 100 includes a component 110 and a heating element 130 (not shown in FIG. 1). Heating element 130 may include an electric heating coil, an electric heating rod, or any other heating device known to those of skill in the art. In an embodiment, heating element 130 is positioned within component 110 as illustrated in FIG. 2. Component 110 may be formed of metal, glass, or any other products known to those of skill in the art that would allow for heat transfer between heating element 130 and a glass surface 120. Glass surface 120 is formed on the surface of component 110. Glass surface 120 may comprise 45S5 bioglass, soda lime glass, or any other glass known to those of skill in the art that is capable of reacting with HFCs as described below. Glass surface 120 may comprise one or more glass beads. In an embodiment, glass surface 120 comprises a plurality of glass beads. In another embodiment, glass surface 120 may include a glass frit, i.e., a granulated composition of ceramic, sand, powder, etc. used to make glass. In still another embodiment, component 110 may consist entirely of a glass and thus may itself comprise glass surface 120. In various other embodiments, any glass configuration known to those of skill in the art that allows for contact between the heated glass and ambient air could be used.

FIG. 2 depicts a cross-sectional view of HFC elimination device 100 in accordance with an illustrative embodiment. As discussed above, HFC elimination device 100 includes a heating element 130 that is positioned within component 110. In alternative embodiments, heating element 130 need not be positioned within component 110 so long as heating element 130 is positioned within a proximity of component 110 such that it may sufficiently heat glass surface 120 as further described below. For example, in an illustrative embodiment component 110 may comprise a sheet of metal having a glass surface and heating element 130 may be positioned behind component 110 but in sufficient proximity to heat the glass surface.

FIG. 2 depicts HFC elimination device 100 having a generally circular cross-section. In alternative embodiments, HFC elimination device 100 may have a cross-sectional shape that is substantially rectangular, square, quadrilateral, oval, or any other shape known to those of skill in the art.

In response to a signal from an HFC sensor indicating the presence of an ambient, gaseous HFC composition, heating element 130 heats glass surface 120. The HFC sensor may be a tin oxide based semiconductor sensor, an infrared sensor, or any other HFC sensor known to those of skill in the art. In an illustrative embodiment, the HFC sensor is connected to an analog or digital input of a microprocessor which is configured to control the heating element. In various embodiments, the HFC sensor may be connected to the microprocessor via a hardwired or wireless communication channel as known to those of skill in the art.

In an alternative embodiment, heating element 130 may be configured to periodically turn on and off. Glass surface 130 is heated via a radiant heating process, whereby heat emitted from heating element 130 radiates outward and is absorbed by glass surface 120. Upon contact with the ambient, gaseous HFC composition, heated glass surface 120 reacts with the HFC composition to form sodium fluoride, calcium fluoride, and possibly other byproducts. The sodium fluoride and calcium fluoride have smaller global warming potential values than the ambient, gaseous HFC composition. These byproducts may dissipate within the ambient air or may sublime on heated glass surface 120.

Heated glass surface 120 reacts with the ambient, gaseous HFC composition through a dealkalization process in which alkali ions are pulled from glass surface 120 and react with the ambient, gaseous HFC composition. The alkali ions of glass surface 120 include sodium oxide ($Na_2O$) and calcium oxide (CaO). As the ambient, gaseous HFC composition reacts with the sodium oxide and calcium oxide of heated glass surface 120, the HFC composition is decomposed and byproducts of sodium fluoride and calcium fluoride are formed. In alternative embodiments, sodium chloride (NaCl) and calcium chloride ($CaCl_2$) may be produced. U.S. Pat. No. 3,249,246 to William P. Mahoney uses a similar chemical reaction to dealkalize soda lime glass container surfaces for food and drug applications, and is herein incorporated by reference in its entirety.

The ambient, gaseous HFC composition may be any one or more of tetrafluoroethane, pentafluoroethane, trifluoroethane, difluoroethane, or any other HFC composition known to those of skill in the art and that will react with heated glass surface 120 as described above with respect to FIG. 1.

Figure 3:
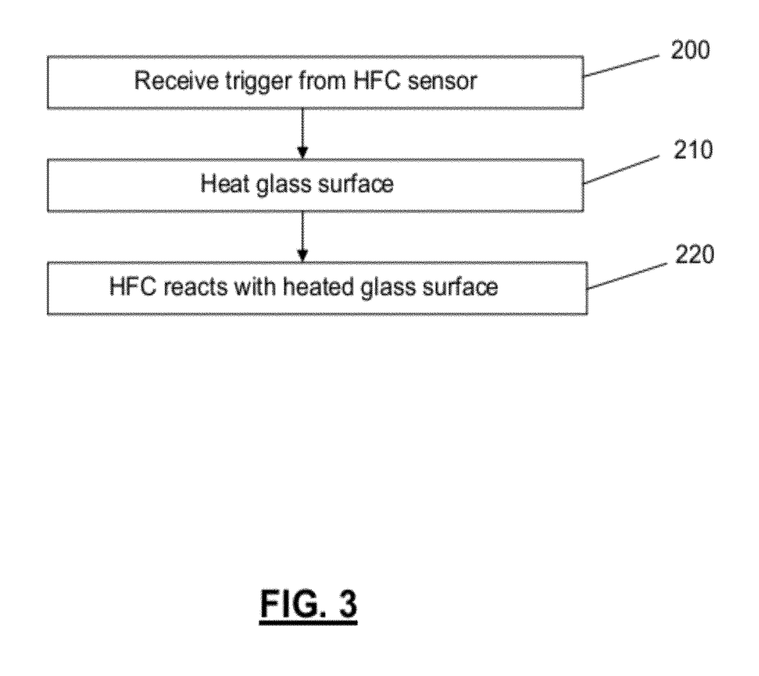
FIG. 3 depicts a method for eliminating HFCs using the HFC elimination device of FIG. 1 in air in accordance with an illustrative embodiment.

FIG. 3 depicts a method for eliminating an ambient HFC composition using HFC elimination device 100 of FIGS. 1 and 2 in air in accordance with an illustrative embodiment. In an operation 200, HFC elimination device 100 receives a trigger such as an electrical signal from an HFC sensor indicating that an ambient HFC composition has been detected. In an illustrative embodiment, the HFC sensor is connected to an analog or digital input of a microprocessor which is configured to control heating element 130 of HFC elimination device 100. In various embodiments, the HFC sensor may be connected to the microprocessor via a hardwired or wireless communication channel as known to those of skill in the art. The threshold amount of HFC required to trigger HFC elimination device 100 depends on the sensitivity of the HFC sensor. In an embodiment, the HFC sensor may detect HFC compositions having concentrations down to around 10 ppt. However, the threshold amount required to trigger HFC elimination device 100 may be any amount that is capable of being detected by an HFC sensor. Accordingly, as more sensitive HFC sensors are developed, lower threshold amounts may be used to trigger HFC elimination device 100.

In an embodiment, the HFC elimination device 100 may be incorporated as part of a refrigeration device (e.g., refrigerator, air conditioner, etc.) that utilizes the HFC composition as a refrigerant, and the ambient HFC composition may have leaked from the refrigeration device. In an alternative embodiment, HFC elimination device 100 may be a portable device that is separate and unique from a refrigeration device, and may be employed after construction of a refrigeration device in order to detect leaked HFC compositions from the refrigeration device.

In an operation 210, an internal heating element heats a glass surface of the HFC elimination device 100 to a temperature of between 200° C. and 250° C. In alternative embodiments, the glass surface may be heated to any temperature at which the HFC will react with the glass surface. Temperatures higher than 200° C. may be utilized as the structure of the glass surface will allow, as extreme temperatures may affect the integrity of the glass surface. In an embodiment, the heating element is positioned within an external case formed of metal, such as but not limited to stainless steel, or another thermally-conductive composition, and the glass surface is heating via a radiant heating process. Heat emitted from the internal heating element radiates outward and is absorbed by external case and transferred to the glass surface.

In an operation 220, the heated glass surface reacts with the ambient HFC composition through a dealkalization process in which alkali ions are pulled from the heated glass surface. In an embodiment, the glass surface includes sodium oxide ($Na_2O$) and calcium oxide (CaO). In alternative embodiments, the glass surface may be substituted for any surface having sufficient concentrations of sodium oxide and calcium oxide. As the ambient HFC composition reacts with the sodium oxide and calcium oxide of the heated glass surface, the ambient HFC composition is decomposed and non-toxic, non-traceable levels of sodium fluoride and calcium fluoride are formed. In this way, the ambient HFC composition is decomposed to form non-toxic byproducts with lower global warming potential values than the ambient HFC composition possessed.

Figure 4:
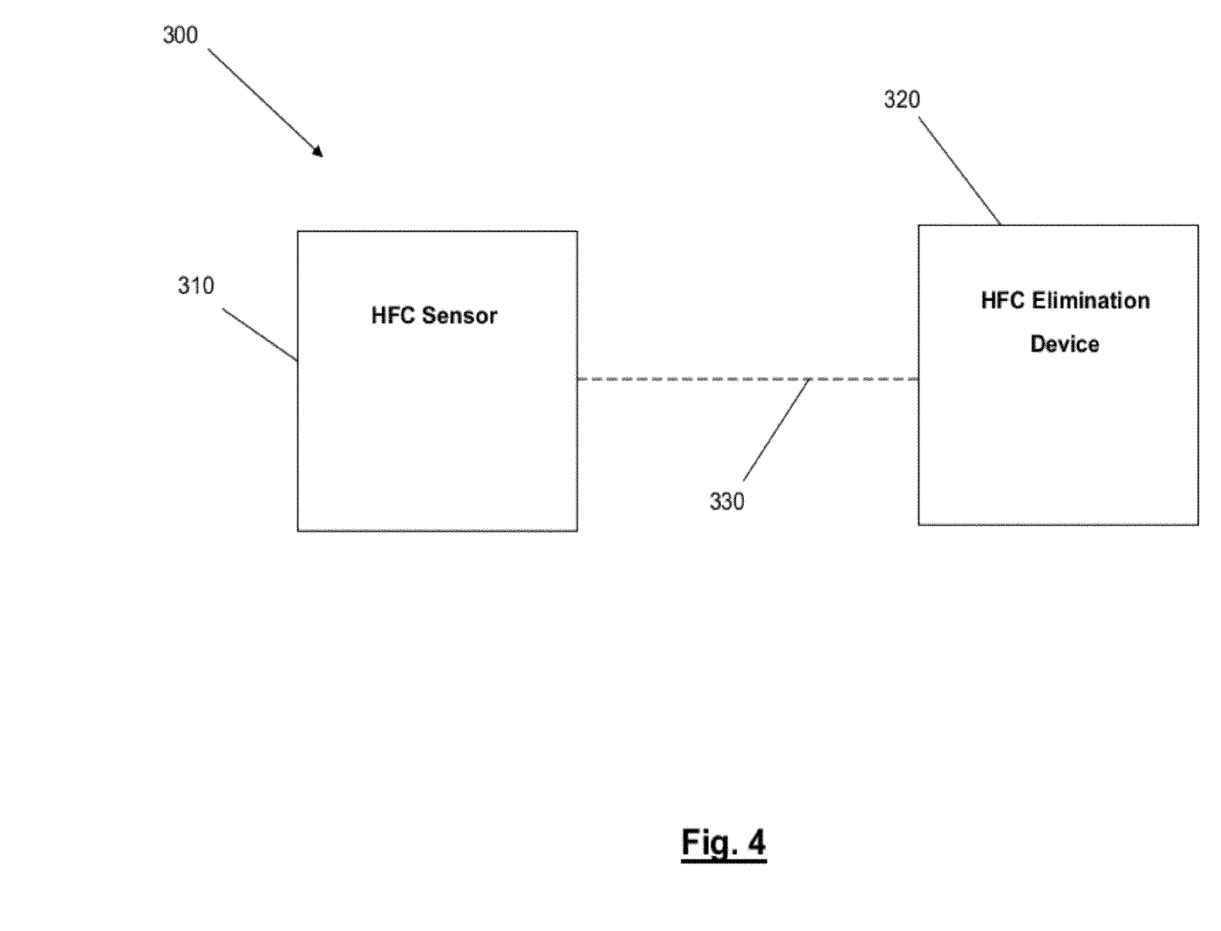
FIG. 4 depicts an HFC detection and elimination system in accordance with an illustrative embodiment.

FIG. 4 depicts an HFC detection and elimination system 300 in accordance with an illustrative embodiment. System 300 includes an HFC sensor 310 that is communicatively coupled to an HFC elimination device 320 by a communication channel 330. In an embodiment, HFC sensor 310 includes a decomposition component and a sensing component. The decomposition component is configured to irradiate ambient air with americium (Am). If the ambient air includes an HFC composition, the irradiated Am causes the HFC composition to decompose to a hydrogen fluoride (HF) gas. The sensing component of HFC sensor 310 is configured to detect the presence of HF gas. Consequently, the sensing component will detect the presence of any HF gas that results from the decomposition of an HFC composition in the ambient air due to irradiation with Am. Upon sensing the HF gas, HFC sensor 310 outputs an electrical signal indicating the presence of the HFC composition. In an illustrative embodiment, the HFC sensor is connected via a hardwired or wireless communication channel to an analog or digital input of a microprocessor which is configured to control the heating element of the HFC elimination device. The threshold level required to trigger the HFC elimination device depends on the sensitivity of the HFC sensor and may be any concentration down to around 10 ppt, or possibly other thresholds depending on the sensitivity of the HFC sensor.

In alternative embodiments, HFC sensor may be a tin oxide based semiconductor sensor, an infrared sensor, or any other sensor capable of detecting HFCs as known to those of skill in the art.

HFC elimination device 320 includes an outer glass surface formed on an external case and an internal heating element positioned within the external case as described above with respect to FIGS. 1 and 2. In response to a signal from HFC sensor 310, the internal heating element of HFC elimination device 320 is configured to heat the glass surface so that upon contact with an ambient HFC composition, the HFC composition will be decomposed as described above with respect to FIGS. 1 and 2.

In an embodiment, system 300 is embodied as part of a refrigeration device such as a refrigerator or an air conditioning device. Such a refrigeration device may include a refrigerant coil through which a refrigerant that includes an HFC composition is passed. The refrigeration device may also include a compressor for compressing the refrigerant. HFC elimination device 320 may be located inside the refrigerant coil, within an area surrounded by the refrigerant coil, or in close proximity to the refrigerant coil of the refrigerant device. In an alternative embodiment, HFC elimination device 320 may be located in or near the compressor. In other embodiments, HFC elimination device 320 may be located in proximity to any component of a refrigeration device where a leak of an HFC composition may be possible as known to those of skill in the art.

Communication channel 330 may be any type of communication channel known to those of skill in the art configured in a manner such that HFC sensor 310 may communicate a signal to HFC elimination device 320. In an illustrative embodiment, HFC sensor 310 is connected to an analog or digital input of a microprocessor which is configured to control the heating element of HFC elimination device 320. The threshold level required to trigger HFC elimination device 320 depends on the sensitivity of HFC sensor 310 and may be any concentration that HFC sensor 310 is capable of detecting. In an embodiment, HFC sensor 310 may be hardwired to HFC elimination device 320. In an alternative embodiment, communication channel 330 may be a wireless communication path. In accordance with such an embodiment, HFC sensor 310 also includes a wireless transmitter configured to transmit a signal from HFC sensor 310 to a wireless receiver of HFC elimination device 320.

In an embodiment HFC elimination device 320 comprises a receiver configured to receive the signal transmitted from HFC sensor 310. Upon receiving the signal the heating element of HFC elimination device 320 is configured to commence heating until another signal is received instructing HFC elimination device 320 to discontinue heating. In an alternative embodiment, HFC elimination device 320 may be manually turned on or off.

Figure 5:
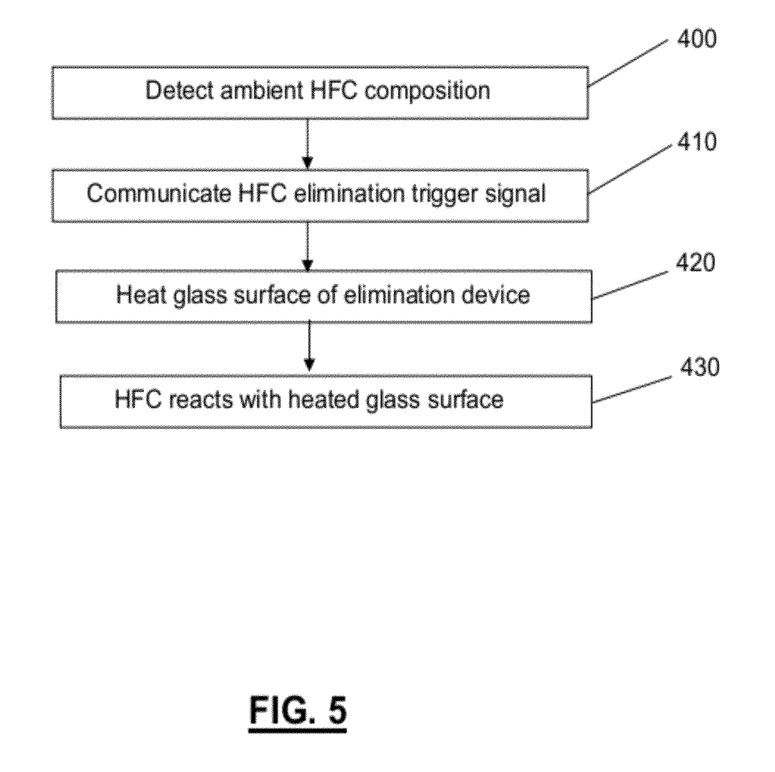
FIG. 5 depicts a method for detecting and eliminating HFCs using the HFC detection and elimination system of FIG. 4 in accordance with an illustrative embodiment.

FIG. 5 depicts a method for detecting and eliminating an ambient HFC composition using HFC detection and elimination system 300 of FIG. 3 in accordance with an illustrative embodiment. In an operation 400, an HFC sensor detects an ambient HFC composition. In response to detection of the ambient HFC composition, the HFC sensor communicates a trigger signal to an HFC elimination device in an operation 410, thereby indicating the presence of an ambient HFC composition. In an embodiment, the presence of the ambient HFC composition, may indicate a leak within a cooling system of a refrigeration device such as a refrigerator or an air conditioner. In an operation 420, in response to receiving the trigger signal, an internal heating element of the HFC elimination device heats a glass surface of the HFC elimination device to a temperature sufficient to cause decomposition of the ambient HFC composition upon contact with the heated glass surface. In one possible embodiment, the glass surface is heated to a temperature of between 200° C. and 250° C.

In an operation 430, the heated glass surface reacts with the ambient HFC composition through a dealkalization process in which alkali ions are pulled from the glass surface and react with the ambient HFC composition. The glass surface may include high levels of sodium oxide ($Na_2O$) and calcium oxide (CaO). As the ambient HFC composition reacts with the sodium oxide and calcium oxide of the heated glass surface, the ambient HFC composition is decomposed and forms byproducts of sodium fluoride and calcium fluoride. In alternative embodiments, sodium chloride (NaCl), calcium chloride ($CaCl_2$), and other byproducts may be produced from the reaction. In this way, the ambient HFC composition is decomposed to form byproducts with lower global warming potential values than the ambient HFC composition.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A hydrofluorocarbon (HFC) elimination device comprising:
    an HFC sensing device configured to detect an ambient, gaseous HFC composition;
    a component comprising a surface that includes glass; and
    a heating element configured to heat the glass to a temperature to decompose the ambient, gaseous HFC composition in response to detection of the ambient, gaseous HFC composition by the HFC sensing device.

2. The HFC elimination device of claim 1, wherein the heating element is further configured to heat the glass to a temperature to decompose the ambient, gaseous HFC composition to one or more compositions having a lesser global warming potential value than the ambient, gaseous HFC composition.

3. The HFC elimination device of claim 2, wherein the one or more compositions having a lesser global warming potential value than the ambient, gaseous HFC composition comprise calcium fluoride and sodium fluoride.

4. The HFC elimination device of claim 1, wherein the component comprises a metal case that surrounds the heating element, and wherein the glass comprises one or more glass beads located on the surface of the component.

5. The HFC elimination device of claim 1, wherein the glass comprises a soda-lime glass.

6. The HFC elimination device of claim 1, wherein the ambient, gaseous HFC composition comprises at least one of tetrafluoroethane, pentafluoroethane, trifluoroethane, and difluoroethane.

7. The HFC elimination device of claim 1, wherein the temperature is between 200° C. and 250° C.

8. The HFC elimination device of claim 1, wherein the HFC sensing device comprises:
    a decomposition component configured to irradiate the ambient, gaseous HFC composition with americium to decompose at least a portion of the ambient, gaseous HFC composition to hydrogen fluoride (HF) gas; and
    a sensing component configured to detect the HF gas, wherein detection of the HF gas indicates the presence of the ambient, gaseous HFC composition.

9. A system comprising:
    a hydrofluorocarbon (HFC) detector configured to detect an ambient HFC composition and to communicate an indication of the presence of the ambient HFC composition to an HFC elimination device; and
    the HFC elimination device communicatively coupled to the HFC detector, wherein the HFC elimination device comprises:
        a component comprising a surface that includes glass; and
        a heating element configured to heat the glass to a temperature to decompose the ambient HFC composition in response to the detection of the ambient HFC composition by the HFC detector.

10. The system of claim 9, wherein the heating element is configured to heat the glass to a temperature to decompose the ambient HFC composition into one or more compositions having a lesser global warming potential value than the ambient HFC composition.

11. The system of claim 9, wherein the component comprises a metal case that surrounds the heating element, and wherein the glass comprises one or more glass beads located on a surface of the metal case.

12. The system of claim 9, wherein the glass comprises a soda-lime glass, and wherein the temperature is between 200° C. and 250° C.

13. The system of claim 9, wherein the ambient HFC composition comprises at least one of tetrafluoroethane, pentafluoroethane, trifluoroethane, and difluoroethane.

14. The system of claim 9, further comprising a refrigerant coil, wherein the HFC detector and the HFC elimination device are located within an area surrounded by the refrigerant coil.

15. The system of claim 9, further comprising a compressor, wherein the HFC detector and the HFC elimination device are located within the compressor.

16. The system of claim 9, wherein the system is embodied with a refrigeration device.

17. A method comprising:
    detecting a presence of an ambient, gaseous HFC composition;
    heating a glass surface to a temperature sufficient to decompose the ambient, gaseous HFC composition in response to said detecting the presence of the ambient, gaseous HFC composition.

18. The method of claim 17, wherein said heating element a glass surface to a temperature comprises heating the glass surface to a temperature to decompose the ambient, gaseous HFC composition to one or more compositions having a lesser global warming potential value than the ambient, gaseous HFC composition.

19. The method of claim 17, wherein the temperature is between 200° C. and 250° C.

20. The method of claim 17, wherein the glass comprises a soda-lime glass, and wherein the ambient, gaseous HFC composition comprises at least one of tetrafluoroethane, pentafluoroethane, trifluoroethane, and difluoroethane.

* * * * *